No. 855,471. PATENTED JUNE 4, 1907.
E. W. MIX.
INSULATING STUD AND METHOD OF MAKING THE SAME.
APPLICATION FILED AUG. 1, 1906.
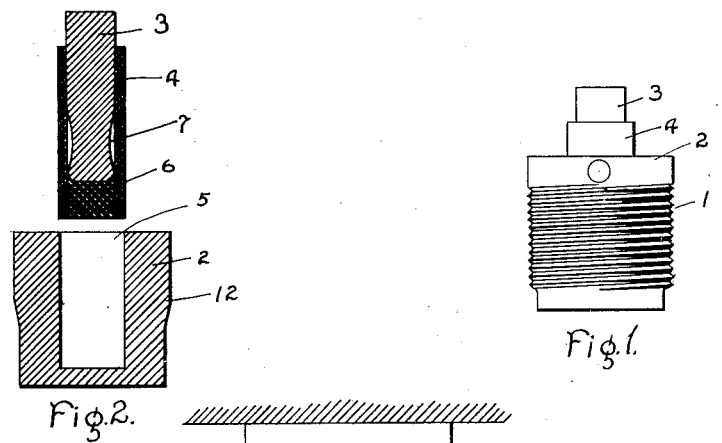
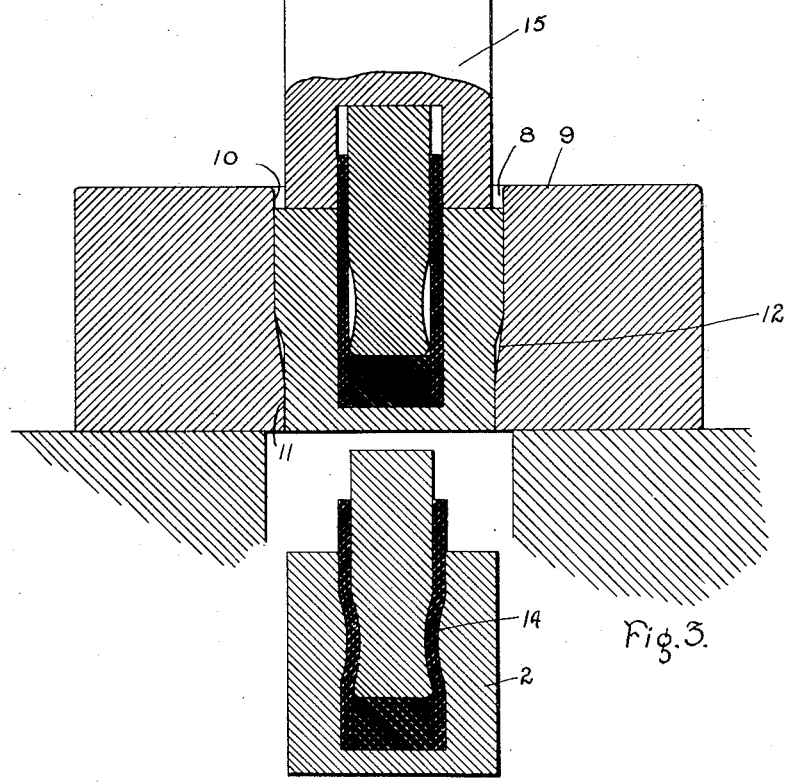
Witnesses:
Inventor:
Edgar W. Mix.
By Albert G. Davis
Atty.

UNITED STATES PATENT OFFICE.

EDGAR W. MIX, OF PARIS, FRANCE, ASSIGNOR TO GENERAL ELECTRIC COMPANY, A CORPORATION OF NEW YORK.

INSULATING-STUD AND METHOD OF MAKING THE SAME.

No. 855,471.    Specification of Letters Patent.    Patented June 4, 1907.

Application filed August 1, 1906. Serial No. 328,673.

*To all whom it may concern:*

Be it known that I, EDGAR W. MIX, a citizen of the United States, residing at Paris, France, have invented certain new and useful Improvements in Insulating-Studs and Methods of Making the Same, of which the following is a specification.

There are many places where it is necessary to make use of a stud, supporting a member rigidly and at the same time insulating it, or to connect together members differing electrically in potential. Heretofore this necessity has given rise to elaborately built up devices, constructed to meet the requirements of each particular condition as it was met. It is evident that the most satisfactory way of accomplishing the desired end is to make use of a stud embodying within itself the insulating feature; but heretofore no stud meeting the requirements that it shall be simple in construction, cheap, and rigid so as to be capable of resisting both axial stresses and stresses at right angle to the axis, has been produced.

The object of the present invention is to provide a stud having these qualities and a method of producing the same.

To the above end, I construct the stud of two members, one member being provided with a socket and the second member being provided with, or a portion thereof forming, a shouldered boss for entering the socket. The boss is surrounded or capped by insulating material, as for example, micanite which may be wrapped about it in the form of a tube. The insulating material may conveniently be put in place about the boss and the whole thereafter slipped into the socket since, when the parts are first assembled there need be no permanency of connection between them; the rigidity and permanency of the whole being obtained by forcing the assembled stud through a suitable die and causing the metal of the walls of the socket to flow and form an internal rib which interlocks with the shoulder on the other member, being however separated therefrom by the insulating material. By heating the stud slightly before it is forced through the die, the insulation or the binding material therein, as the case may be, is softened and the insulation can assume its new form without having its continuity broken. The resulting stud is therefore strong and durable and the ends thereof are reliably insulated from each other.

In the accompanying drawing, Figure 1 shows a stud embodying the present invention and finished so as to be ready for use; Fig. 2 is a cross section showing the two stud members in the rough in the act of being assembled; Fig. 3 shows in cross section a set of dies and an assembled stud which is about to be forced through the dies; and Fig. 4 shows in cross-section a stud which has just been forced through the dies and the parts brought into the condition wherein they combine to make a single rigid whole.

Reference being made to the drawing, 1 indicates a stud which, although shown as a stud adapted for use in supporting collector rings upon their shafts, may take any desired form which will adapt it for the use in a position wherein a two-part stud is needed or desired. This stud comprises members 2 and 3 insulated from each other by suitable insulating material 4. In its rough form, the member 2 consists of a piece of metal, preferably copper, of any desired form and provided with a socket 5. The member 3 consists of a metal plug or pin, also of any desired form, having one end shaped so as to enter the socket in the member 2, leaving, however, considerable clearance between it and the walls of the socket. The end of the member 3 is inclosed in a tube of insulating material 4, which may conveniently be made up of a sheet or sheets of micanite wrapped about the member. The insulating tube projects beyond one end of the stud member, so that a plug of insulating material 6 may be placed within the end of the tube and rest against the end of the stud member. The member 3 with its envelop of insulating material is then placed in socket 5 and the stud is ready to be operated upon so as to connect the parts into one rigid whole. The end of member 3 which enters the socket is provided with a shoulder which may conveniently be produced by forming an annular groove 7 near this end, and the member 2 is provided throughout a portion of the length of the socket with a thickened portion 13 which is situated opposite the groove 7. This extra metal in the member 2 provides the necessary material for producing an internal rib or projection within the socket for interlocking with the shoulder produced by the groove 7.

When the parts have been assembled in the manner just described, the stud is placed within an opening 8 in a die 9. This opening is so shaped and proportioned that the upper portion 10 thereof is large enough to receive the thickened portion of the stud member 2, while the lower portion 11 is only large enough to permit the remainder of the stud to pass through. The upper and lower portions of this opening are connected by a cone-shaped portion 12. If now the entire plug is forced through the opening in the die, the thickened part of member 2 has its diameter reduced to that of the remainder of this member, and the material which is thus compressed toward the axis of the plug flows so as to form the annular rib 14 in the interior of the member 2, this rib being complementary to the groove 7 in the member 3, and the rib and groove locking the two members securely together. The studs may be forced through the die in any suitable way, as for example, the die may be placed in a press and the stud be engaged by the hollow plunger 15 of the press.

If the stud is heated sufficiently to soften the shellac in the micanite before it is placed in the press, the sheets of mica can slip freely past each other as the rib 14 is being formed, and therefore no break will occur in the insulation. I have found that studs made in this way possess great mechanical strength, both in the axial direction and in directions at an angle of the axis, and do not loosen in actual service. At the same time, a reliable insulation is always secured between the two ends of the stud.

It will be seen that after the stud has been forced through the die, it may be conveniently finished to any desired form, since either end may be held in a chuck while the other end is operated upon by a tool, without the danger of loosening the parts or disarranging the insulation in any way. Studs adapted to a great variety of uses may be made without altering the process of producing them, since the actual and relative lengths and proportions of parts may be varied at will.

What I claim as new and desire to secure by Letters Patent of the United States, is,—

1. The method of making an insulating stud which consists in placing a shouldered portion of one member within a metal socket of the other portion with a cap of insulating material surrounding the shouldered portion, and then causing the metal of the socket member to flow so as to force the insulation against the shoulder on the other member.

2. The method of making a two-part metal insulating stud which consists in placing a shouldered portion of one part within a socket in the other part with a cap of insulating material surrounding the shouldered portion and then forcing the assembled stud through a die so as to cause the metal of the walls of the socket to flow and form a rib interlocking with the shoulder on the other part.

3. The method of making a two-part insulating stud which consists in forming one part with a socket and a portion at one point in the wall of the socket with an enlarged external diameter, forming the other part with a shouldered portion, placing the shouldered portion in the socket with a cap of insulating material between, and then reducing the diameter of the part having the enlarged diameter in such a manner that the metal of that portion is caused to flow and force the insulation against the shoulder on the other part.

4. The method of making a two-part metal insulating stud which consists in forming one part with a socket and a portion at one point in the wall of the socket with an enlarged diameter, forming the other part with a portion having an annular groove, placing the grooved portion in the socket with a layer of insulating material between the grooved portion and the walls of the socket, and then causing the metal of the enlarged socket portion to flow so as to reduce its external diameter and produce an internal rib complementary to the groove in the other part.

5. The method of making a two-part metal insulating stud which consists in forming one part with a socket and a portion at one point in the wall of the socket with an enlarged diameter, forming the other part with a portion having an annular groove, placing the grooved portion in the socket with a layer of insulating material between the grooved portion and the walls of the socket, and then forcing the assembled stud through an opening in a die so as to reduce the external diameter of the enlarged part on the socket portion and produce an internal rib complementary to the groove in the other part.

6. The method of making a two-part metal stud which consists in forming one part with a portion having a shoulder, forming the other part with a socket, placing a cap of micanite about the shouldered portion, assembling the capped portion in the socket, heating the assembled stud, and then forcing the stud through a die so as to cause the metal of the wall of the socket member to flow and form a rib interlocking with the shoulder on the other part.

7. A two-part insulating stud consisting of a part having a shouldered portion, and a part having a socket containing said shouldered portion and a cap of insulating material surrounding said latter portion, said socket having an internal shoulder interlocking with the shoulder on the other part and produced by causing the metal of the socket member to flow inward.

In witness whereof, I have hereunto set my hand this 25th day of July, 1906.

EDGAR W. MIX.

Witnesses:
BENJAMIN B. HULL,
GRACE M. HANIGAN.